(12) United States Patent
Foerster et al.

(10) Patent No.: US 9,644,586 B2
(45) Date of Patent: May 9, 2017

(54) SOLENOID VALVE AND METHOD FOR PRODUCING SOLENOID VALVES

(71) Applicant: Robert Bosch GmbH, Stuttgart (DE)

(72) Inventors: Juergen Foerster, Ingersheim (DE); Kai Kroeger, Unterhaching (DE); Okke Venekamp, Rosenheim (DE); Stephan Dirnberger, Haar (DE)

(73) Assignee: Robert Bosch GmbH, Stuttgart (DE)

( * ) Notice: Subject to any disclaimer, the term of this patent is extended or adjusted under 35 U.S.C. 154(b) by 191 days.

(21) Appl. No.: 14/318,724

(22) Filed: Jun. 30, 2014

(65) Prior Publication Data

US 2015/0001319 A1    Jan. 1, 2015

(30) Foreign Application Priority Data

Jun. 28, 2013    (DE) .................. 10 2013 212 681

(51) Int. Cl.
| | | |
|---|---|---|
| *F16K 31/02* | (2006.01) | |
| *F02M 51/06* | (2006.01) | |
| *F02M 21/02* | (2006.01) | |
| *B23P 15/00* | (2006.01) | |
| *F02M 61/18* | (2006.01) | |
| *F16K 31/06* | (2006.01) | |

(52) U.S. Cl.
CPC ....... *F02M 51/0664* (2013.01); *B23P 15/001* (2013.01); *F02M 21/0254* (2013.01); *F02M 21/0263* (2013.01); *F02M 21/0272* (2013.01); *F02M 61/1853* (2013.01); *F16K 31/0693* (2013.01); *Y02T 10/32* (2013.01); *Y10T 29/49409* (2015.01)

(58) Field of Classification Search
CPC .......... F02M 51/0664; F02M 51/0625; F02M 61/1853
USPC ............ 137/625.28, 625.33, 625.37, 516.13, 137/516.11; 239/585.1, 585.3; 251/129.07; 29/890.122
See application file for complete search history.

(56) References Cited

U.S. PATENT DOCUMENTS

| | | | | |
|---|---|---|---|---|
| 1,695,069 | A * | 12/1928 | Tuttle ...................... | F16K 15/12 137/516.13 |
| 1,971,171 | A * | 8/1934 | Bebbington ............ | F16K 15/10 137/516.13 |
| 2,525,054 | A * | 10/1950 | Voss ..................... | F04B 39/0016 137/516.13 |
| 2,838,068 | A * | 6/1958 | Alton ................... | F16K 31/0658 137/625.33 |
| 3,241,768 | A * | 3/1966 | Croft .................. | F02M 51/0625 239/124 |
| 3,312,241 | A * | 4/1967 | Bryant .................. | F16K 3/0209 137/246.18 |

(Continued)

FOREIGN PATENT DOCUMENTS

| | | |
|---|---|---|
| DE | 102007002841 | 7/2008 |
| DE | 102007003213 | 7/2008 |
| WO | 2005043016 | 5/2005 |

*Primary Examiner* — John Fox
(74) *Attorney, Agent, or Firm* — Michael Best & Friedrich LLP

(57) ABSTRACT

A solenoid valve for metering a fluid into an intake tract (1) of an engine, said solenoid valve comprising a solenoid assembly (2), an armature (3) interacting with the solenoid assembly (2) and a stroke-movable valve disc (4) connected to the armature (3) for opening and closing at least one through-flow aperture (6) formed in a valve plate (5).

7 Claims, 3 Drawing Sheets

(56) References Cited

U.S. PATENT DOCUMENTS

| | | | | |
|---|---|---|---|---|
| 4,156,506 A * | 5/1979 | Locke | ................ | F02M 51/0614 239/585.3 |
| 4,300,595 A * | 11/1981 | Mayer | ...................... | F16K 1/34 137/625.33 |
| 4,483,363 A * | 11/1984 | Madoche | ............ | F04B 39/1033 137/329.04 |
| 4,511,082 A * | 4/1985 | Ballik | ................. | F02M 51/0671 239/453 |
| 4,515,129 A * | 5/1985 | Stettner | .............. | F02M 51/0639 123/472 |
| 4,681,142 A * | 7/1987 | Woeller | .............. | F16K 31/0658 137/614.11 |
| 4,708,317 A * | 11/1987 | Hiyama | .................... | H01F 7/08 239/585.3 |
| 4,718,455 A * | 1/1988 | Dussourd | ............ | F04B 39/1053 137/625.3 |
| 4,787,418 A * | 11/1988 | Chute | .................... | F02M 69/08 137/625.48 |
| 4,813,610 A * | 3/1989 | Renowden | ......... | F02M 51/0639 239/499 |
| 4,947,887 A * | 8/1990 | Fox | ....................... | F16K 31/402 137/625.61 |
| 5,381,966 A * | 1/1995 | Gernert, II | ............. | F02M 61/20 239/585.1 |
| 5,398,724 A * | 3/1995 | Vars | ........................ | F02D 41/20 123/490 |
| 5,927,331 A * | 7/1999 | Suzuki | ..................... | F16K 1/34 137/625.33 |
| 6,112,765 A * | 9/2000 | Boyer | ................... | F02D 41/221 137/554 |
| 6,422,198 B1* | 7/2002 | VanBrocklin | ............. | B05B 1/14 123/294 |
| 6,505,112 B1* | 1/2003 | Merminod | .............. | F16K 31/06 239/585.1 |
| 6,871,803 B1* | 3/2005 | Ohmi | ........................ | F16K 7/14 239/533.3 |
| 7,896,028 B2* | 3/2011 | Weyer, Jr. | ........... | F16K 31/1262 137/625.33 |
| 8,272,399 B2* | 9/2012 | Farrow | .............. | F02M 51/0642 137/601.02 |
| 2002/0002997 A1* | 1/2002 | Steinruck | ............ | F04B 39/1033 137/516.11 |
| 2004/0177884 A1* | 9/2004 | Konishi | ............. | F02M 37/0029 137/540 |
| 2009/0057445 A1* | 3/2009 | Hung | ................. | F02M 61/1853 239/533.12 |
| 2010/0140380 A1* | 6/2010 | Gruendl | ............ | F02M 51/0621 239/585.3 |
| 2011/0186765 A1* | 8/2011 | Jaeb | ...................... | F04B 43/046 251/331 |
| 2015/0001319 A1* | 1/2015 | Foerster | ................ | B23P 15/001 239/585.3 |

* cited by examiner

SOLENOID VALVE AND METHOD FOR PRODUCING SOLENOID VALVES

BACKGROUND OF THE INVENTION

The invention relates to a solenoid valve for metering a fluid into an intake tract of an engine. The invention further relates to a method for producing a series of solenoid valves which differ with regard to the maximum flow rate thereof.

The specified solenoid valve is particularly to be used as a metering valve for a gaseous medium, preferably for a gaseous fuel. Furthermore, the valve's use in large engines is of primary importance. The mass flow rates up to 3000 kg/h typically required for large engines require relatively large opening cross-sections of the metering valves used therein. At the same time, the metering valves must be able to meter small amounts of fluid in low load ranges. This ability requires high switching dynamics. In order to be able to realize said high switching dynamics, it is necessary to keep the switching forces as low as possible. As a rule, pressure-compensated valves are therefore used.

A pressure-compensated, electromagnetically actuated valve for use in large engines is based, by way of example, on the American patent specification U.S. Pat. No. 8,272,399 B2. Said valve comprises a solenoid assembly, a stroke-movable armature that interacts with the solenoid assembly and a stroke-movable valve disc which is connected to the armature and is used for opening and closing a plurality of slit-like through-flow apertures in a valve plate. The stroke-movable valve disc likewise comprises slit-like through-flow apertures, between which a sealing surface remains that can be brought into register with the through-flow apertures of the valve plate in order to seal off a valve chamber from a pressure chamber located outside of the valve. The pressure chamber located outside of the valve is connected via a central pressure compensation hole, which passes through the valve plate and the valve disc, to a pressure compensation chamber; thus enabling the same pressure to prevail in the pressure compensation chamber and in the pressure chamber, which pressure generates a compressive force acting on the armature in the closing direction and a compressive force acting on the valve disc in the opening direction. The pressure prevailing in the valve chamber, which generates a compressive force on the valve disc in the closing direction and a compressive force on the armature in the opening direction, is likewise applied to the armature and the valve disc. The surfaces subjected to pressure are selected such that the movable components, namely the armature and the valve disc are substantially pressure compensated in the closed position. The pressure balance results in the required switching forces being significantly reduced.

Such pressure-compensated valves have however the disadvantage that, as the flow cross-sections of the through-flow apertures provided in the valve plate change, the surfaces relevant for the pressure balance also change. A change in the flow cross-sections can, for example, be due to customer specific requirements. As a result, the movable components and/or the solenoid assembly have to be redesigned and readjusted to one another in order to reestablish the pressure balance.

SUMMARY OF THE INVENTION

On the basis of the technical field mentioned above, the aim underlying the present invention is to specify a solenoid valve for metering a fluid which, in terms of conceptual design, easily facilitates an adaptation to customer specific requirements.

The solenoid valve proposed for metering a fluid into an intake tract of an engine comprises a solenoid assembly, an armature that interacts with the solenoid assembly and a stroke-movable valve disc connected to the armature for opening and closing at least one through-flow aperture configured in a valve plate. According to the invention, the through-flow aperture opens into a recess of an end face of the valve plate, which end face is oriented towards the valve disc. The invention further states that a sealing face of the valve disc lies opposite the recess, said sealing face being provided for sealing the recess from a valve chamber. In the closed position of the valve, the pressure p2 prevailing in the intake tract, which is less than a pressure p1 prevailing in the valve chamber, is therefore applied to the sealing face of the valve disc which can be brought into register with the recess of the valve plate. The size of the overlap region thereby determines the compressive force which results from the pressure p2 and acts on the valve disc in the opening direction. This applies irrespective of how large the flow cross-section is of the at least one through-flow aperture opening into the recess; thus enabling said flow cross-section to be arbitrarily selected. The flow cross-section of the at least one through-flow aperture, which fluidly connects the recess to the intake tract, must only enable a sufficiently quick pressure balance between the intake tract and the recess. It is important to ensure that the pressure balance between the pressure in the recess and the pressure in the intake tract has occurred before the next opening of the valve.

By the flow cross-section of the through-flow aperture of the valve plate which opens out into the recess being arbitrarily selectable, the aperture cross-section or flow rate through the valve can be easily adapted to the respective customer specific requirements. In order to cover the demand for a variety of different valves having different aperture cross-sections or, respectively, flow rates, provision must therefore only be made for a corresponding variety of valve plates which differ with regard to the flow cross-section of the at least one through-flow aperture. Apart from that, the same components can be used so that solely the replacement of the valve plate enables a large splay of the aperture cross-sections or flow rates. In so doing, the replacement of the valve plate does not affect any pressure balance caused by means of the faces on the armature and the valve disc that are subjected to pressure.

In a basic layout, the valve can, for example, be designed for a mass flow of 3000 kg/h. As a function of the number, the arrangement, the form and/or the size of the at least one through-flow aperture used in each case, the flow rate can be reduced in different stages without having to adapt the other active components. In particular, the valve housing, the solenoid assembly, the armature and/or the valve disc can remain unchanged. By means of a valve basic type which comprises as many non-variable parts as possible, many different valves can be implemented in order to meet the respective customer requirements. Provision must only be made for different valve plates. As a result, development, manufacturing and storage costs remain low.

According to a preferred embodiment of the invention, a plurality of through-flow apertures opens into the recess. This facilitates the pressure balance between the intake tract and the recess after the valve has been closed, thus enabling, in the shortest amount of time, the pressure p2 prevailing in the intake tract to also prevail in the recess of the valve plate or, respectively, to be applied to the sealing face of the valve disc, which face seals off the recess from the valve chamber.

According to a further preferred embodiment of the invention, a plurality of recesses is formed in the end face of the valve plate. The sealing face of the valve disc lies opposite the recesses in order to seal them off from the valve chamber. At least one through-flow aperture opens out thereby into each recess in order to provide a fluidic connection to the intake tract. As seen in plan view, each recess preferably has a circular arc-shaped course and the several recesses running in a circular arc-shaped manner are arranged concentrically to one another. Such recesses can be easily produced.

The invention further states that the valve disc has a plurality of through-flow apertures, which lie opposite the end face of the valve plate in order to seal off the valve chamber from the recess(es) of the valve plate. The through-flow apertures of the valve disc likewise preferably run in a circular arc-shaped manner and are arranged concentrically to one another, wherein the through-flow apertures of the valve disc are arranged in each case offset to the recesses of the valve plate. In so doing, it is ensured that the sealing face of the valve disc seals off the valve chamber towards the outside in the closed position.

The armature and the valve disc are advantageously substantially pressure compensated in the closed position. The switching of the valve therefore requires small forces which can be produced by means of a simple solenoid assembly even at large pressures and/or mass flow rates.

In order to implement a pressure balance in the closed position, it is proposed that the armature and the valve disc have faces that lie opposite one another at the valve chamber and are substantially equal in size. Because the faces of the armature and the valve disc lie opposite one another at the valve chamber, the pressure p1 of the valve chamber is applied here in each case. By the faces being at least approximately equal in size, the armature and the valve disc are subjected to a substantially equally large compressive force in opposite directions so that the forces are for the most part balanced. The faces on the armature and/or on the valve disc that are subjected to pressure can thereby also be composed of a plurality of sub-faces.

The armature preferably delimits a pressure chamber via an end face, said pressure chamber being sealed off from the valve chamber by means of a sealing element and being able to be fluidly connected to the intake tract via boreholes in the valve disc. The boreholes in the valve disc and the valve plate are capable in this way of producing a pressure balance between the pressure chamber and the intake tract. This results in a compressive force which acts on the armature in the closing direction and is capable of compensating an opening force that results from the pressure of the intake tract and acts on the sealing face of the valve disc.

In an advantageous manner, the end face of the armature which delimits the pressure chamber is substantially the same size as the sealing face of the valve disc, which can be brought into register with the recess or recesses of the valve plate; thus enabling the armature and the valve disc to be substantially pressure compensated in the closed position.

In order to meet the aim of the invention mentioned above, a method is proposed for producing a series of solenoid valves which differ with regard to the maximum flow rate thereof. In the method, a valve plate consisting of a plurality of provided valve plates, which differ with regard to the number, arrangement, form and/or size of at least one through-flow aperture, is selected for each solenoid valve in order to establish the maximum flow rate and is used with otherwise substantially identical components. Through the use of the inventive method, development, manufacturing and storage costs can be reduced because substantially identical components are used. Only the valve plate is selected for adapting the solenoid valve to the respective customer specific requirements from a variety of valve plates which essentially, however, differ only with regard to the flow cross-section of the at least one through-flow aperture. Apart from that, the valve plates have for the most part the same design. All of the valve plates can therefore be used with the same housing, the same valve disc, the same armature and/or the same solenoid assembly.

When using the method, valve plates are preferably kept in stock and used which have at least one recess in an end face thereof, into which recess the through-flow aperture opens. In this way, the selection of the valve plate has no affect on any adjusted pressure balance or equilibrium of forces at the faces of the movable components which are subjected to pressure.

BRIEF DESCRIPTION OF THE DRAWINGS

Preferred embodiments of a solenoid valve according to the invention are described below in detail with the aid of the attached drawings. In the drawings.

DETAILED DESCRIPTION

Figure 1:
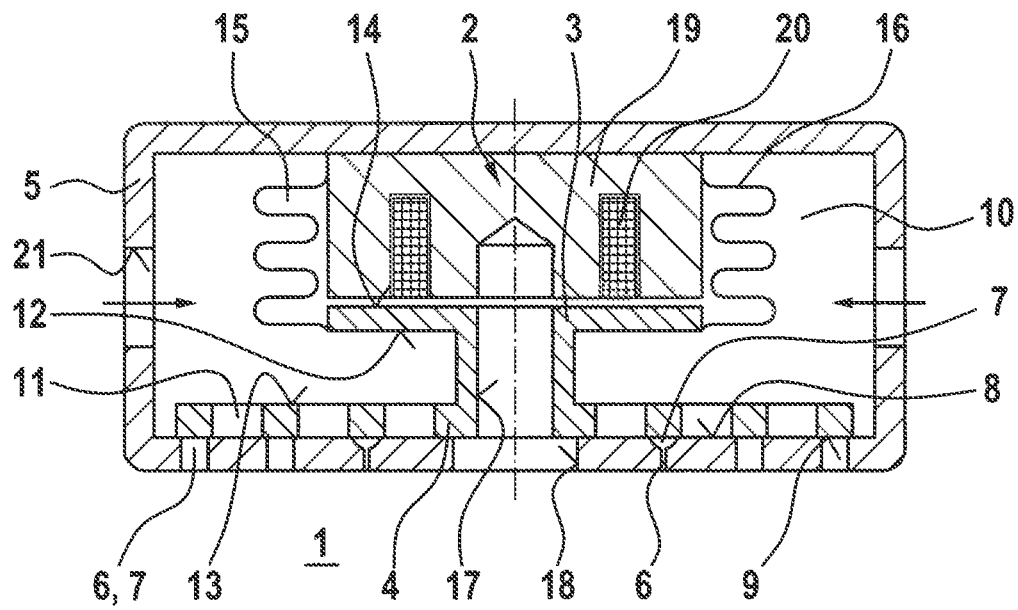
FIG. 1 shows a schematic longitudinal section through an inventive solenoid valve according to a preferred embodiment.

A preferred embodiment of a solenoid valve according to the invention can be seen in the depiction in FIG. 1. The solenoid valve comprises a valve plate 5 which simultaneously serves as a housing and in which a valve chamber 10 is formed. In order to fill the valve chamber 10 with a gaseous medium, in particular with a gaseous fuel, the valve plate 5 has a plurality of radial boreholes 21. The gaseous medium supplied via the radial boreholes 21 to the valve chamber 10 has a pressure p1 upon entering the valve chamber 10. Outside of the valve, a pressure p2 which is smaller than p1 prevails in an intake tract. When the valve is in the open position, the gaseous medium therefore flows into the intake tract 1.

Figure 3:
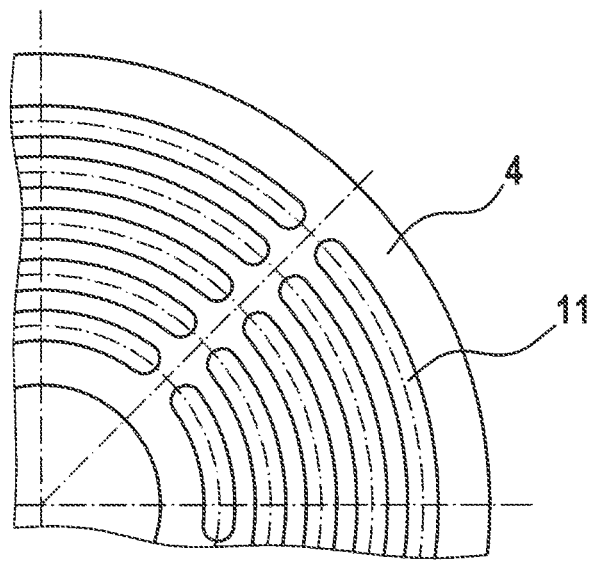
FIG. 3 shows a partial top view of a valve disc of a solenoid valve according to the invention.

The valve plate 5 has a plurality of through-flow apertures 6 via which the gaseous medium enters the intake tract 1 from the valve chamber 10 if the valve is open. A stroke-movable valve disc 4, which is fixedly connected to an armature 3, is accommodated in the housing for the purpose of opening and closing the through-flow apertures 6. The armature 3 including the valve disc 4 can be actuated by means of a solenoid assembly 2 that is also accommodated in the housing. When current is passed through a solenoid coil 20 of the solenoid assembly 2, the armature 3 and the valve disc 4 are pulled towards the coil 20, wherein the valve disc 4 lifts off from an end face 8 of the valve plate 5, which serves as a valve seat, and unblocks the through-flow apertures 6. The solenoid coil 20 is surrounded by a solenoid core 19 of the solenoid assembly 2, on which core a sealing element 16 is fixed. The sealing element 16 is further fixed to the armature 3 in order to form a pressure chamber 15; thus enabling said sealing element 16 to simultaneously seal the pressure chamber 15 from the valve chamber 10. The pressure chamber 15 is fluidly connected via a central borehole 17 in the valve disk 4 or the armature 3 and a central borehole 18 in the valve plate 5 to the intake tract 1. Thus, the pressure p2 likewise prevails in the pressure chamber 15. Because the armature 3 delimits the pressure chamber 15 in the axial direction by means of an end face 14, the pressure p2 is applied to the armature 3 on the pressure chamber side. On the valve chamber side, the pressure p1 is applied to a face 12 of the armature 3. The face 13 of the valve disc 4 lies opposite the face 12 at the valve chamber 10. The face 13 is composed of a plurality of individual faces because a plurality of flow-through openings 11 passes through the valve disc 4. The number, the arrangement, the form and the size of the through-flow apertures 11 is thereby matched to those of the through-flow apertures 6 of the valve plate 5; thus enabling the end face 8 of the valve plate 5 to lie opposite the through-flow apertures 11 of the valve disc 4 and a sealing face 9 of the valve disc 4 to lie opposite the through-flow apertures 6 of the valve plate 5. In the present embodiment, the through-flow apertures 11 of the valve disc 4 have a circular arc-shaped course and are disposed concentrically to one another (see FIG. 3).

Figure 2:
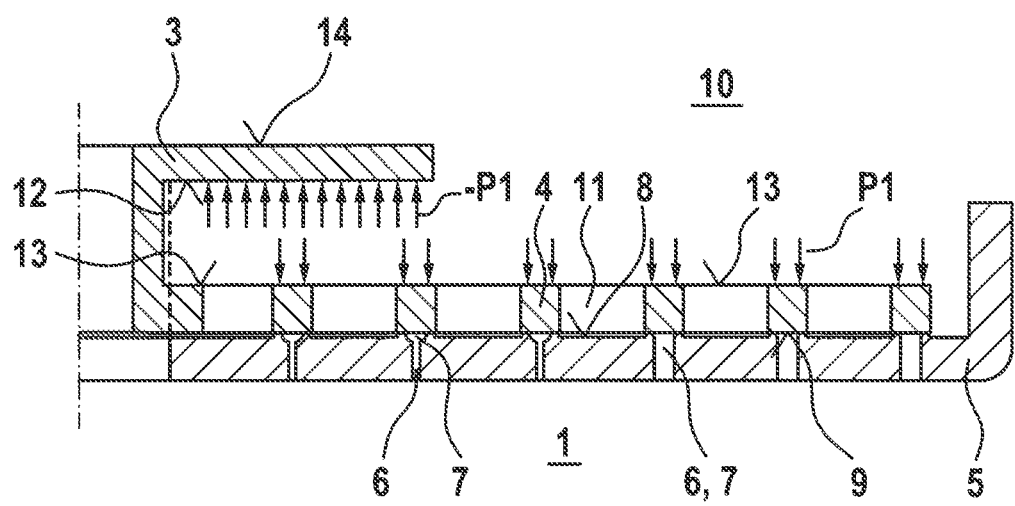
FIG. 2 shows a schematic longitudinal section in an enlarged view for explaining the pressure balance or equilibrium of forces at the movable components of a solenoid valve according to the invention.

The through-flow apertures 6 of the valve plate 5 coincide in part with recesses 7 which are formed in the end face 8 of the valve plate 5 and therefore lie opposite the sealing face 9. The recesses 7 are however not continuous radially on the inside but form a pressure equalization chamber which is fluidly connected via through-flow apertures 6 having a reduced flow cross-section to the intake tract 1. If—as depicted in FIG. 2—the faces 12, 13 on the armature and the valve disc 4 which are subjected to the pressure p1, wherein in this case the face 13 is composed of a plurality of sub-faces, are now selected to be of equal size, the resulting forces acting on the armature 3 and the valve disc 4 are balanced. A complete pressure balance or equilibrium of forces at movable components is particularly established if the faces subjected to the pressure p2 are likewise selected to be of equal size. This relates to the end face 14 of the armature 3 and the sealing face 9 of the valve disc 4 which can be brought into register with the through-flow apertures 6 or the recesses 7 when the valve is closed.

Figure 4:
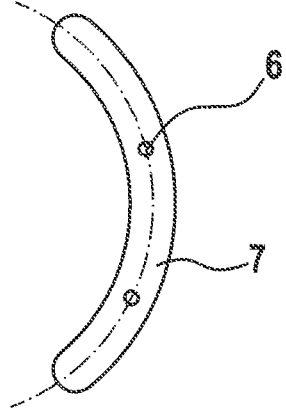
FIG. 4 shows a partial top view of a valve plate of an inventive solenoid valve in the region of a recess.
Figure 5:
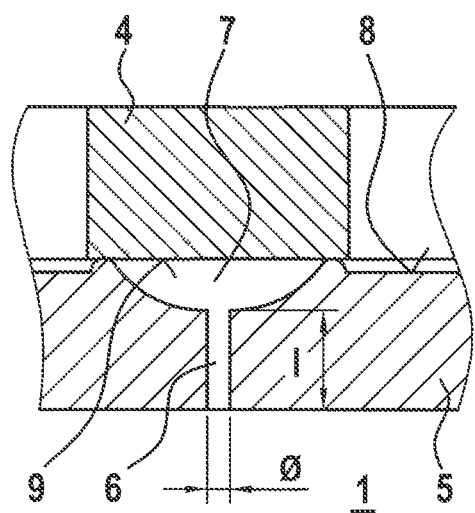
FIG. 5 shows a schematic cross-section, in an enlarged view, through a valve plate and a valve disc of an inventive solenoid valve in the region of a recess and a through-flow aperture.

In order not to alter this surface ratio, if the flow cross-section of individual through-flow apertures 6 in the valve plate 5 is reduced, recesses 7 are provided instead of through-flow apertures. In plan view, said recesses have the same dimensions as the original through-flow apertures 6 but do not extend over the entire height of the valve plate 5. In order that the pressure p2 prevails when the valve is closed, so that the pressure p2 continues to be applied to the sealing face 9 of the valve disc 4, the recesses 7 are connected via at least one through-flow aperture 6 having a reduced flow cross-section to the intake tract 1 (see FIGS. 4 and 5). In the case of the circular borehole depicted that serves as a through-flow aperture, the diameter and therefore the free flow cross-section is, for example, 1 mm. The free flow cross-section and the length l of the at least one through-flow aperture is selected such that a quicker pressure balance occurs between the recess 7 serving as a pressure equalization chamber and the intake tract 1 in order in this way to establish a pressure balance or equilibrium of forces at the movable components.

Provided that the dimensions of the recess 7 remain unchanged in the plan view of the valve plate 5, the free flow cross-section of the through-flow aperture 6 that opens out into the recess 7 can be arbitrarily changed. In so doing, the flow rate of the valve can be varied and adapted to customer specific requirements without affecting the targeted pressure balance or equilibrium of forces at the movable components. In order to adapt the valve to the respective customer requirements, identical components can thus for the most part be used. Provision has only to be made for different valve plates 5 having different through-put apertures 6.

Figure 6:
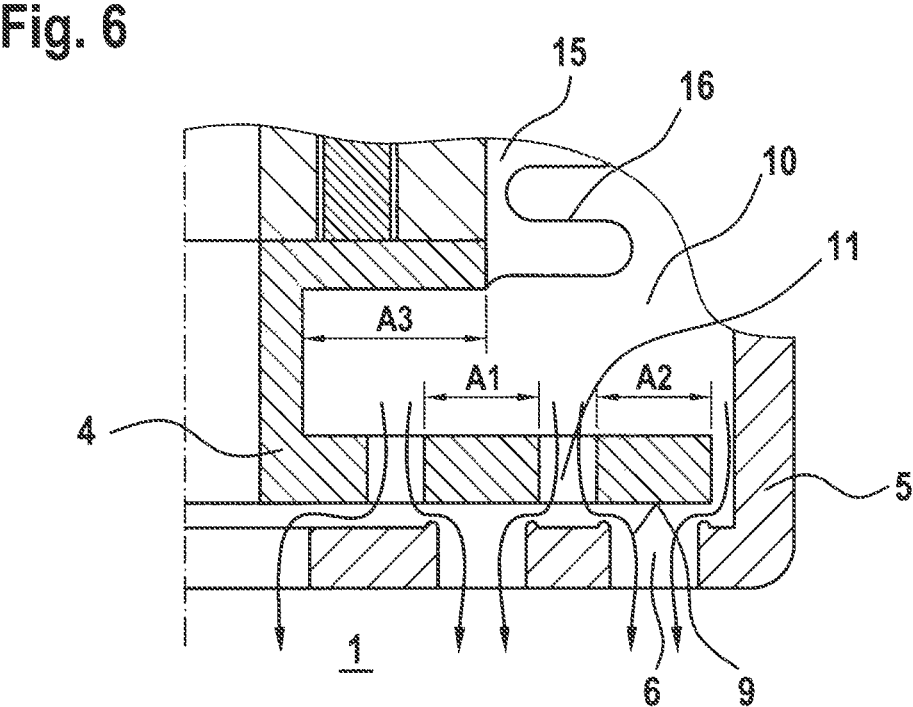
FIG. 6 shows a schematic longitudinal section through a known solenoid valve.
Figure 7:
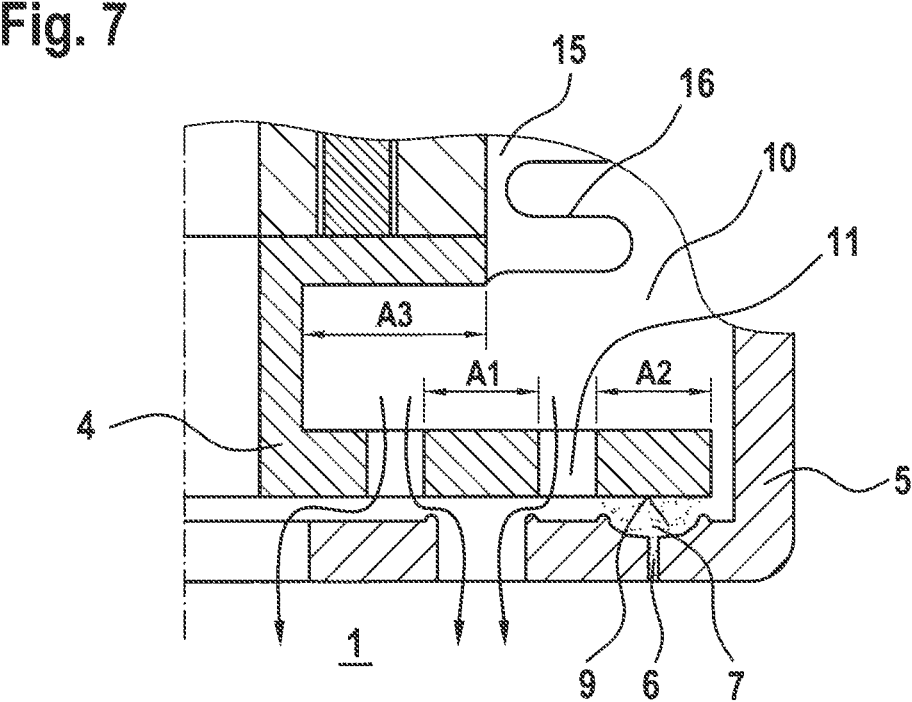
FIG. 7 shows a schematic longitudinal section through a solenoid valve according to the invention.

The comparison of FIGS. 6 and 7 shows that—based on a valve basic type corresponding to FIG. 6—the free flow cross-section of the radially internal through-flow aperture 6 of the valve plate 5 can be reduced when a recess 7 is simultaneously disposed in accordance with FIG. 7 without the surface ratio at the faces subjected to pressure changing. The essential factor here is that the face of the armature 3, which is denoted in FIGS. 6 and 7 as face $A_3$, is approximately equally as large as the sum of the sub-faces $A_1$ and $A_2$ of the valve disc 4.

What is claimed is:

1. A solenoid valve for metering a fluid into an intake tract (1) of an engine, said solenoid valve comprising a solenoid assembly (2), an armature (3) interacting with the solenoid assembly (2) and a stroke-movable valve disc (4) connected to the armature (3) for opening and closing at least one through-flow aperture (6) formed in a valve plate (5), characterized in that the through-flow aperture (6) opens into a recess (7) of an end face (8) of the valve plate (5), which end face is oriented towards the valve disc (4), and in that a sealing face (9) of the valve disc (4) for sealing off the recess (7) from a valve chamber (10) lies opposite the recess (7), wherein the armature (3) and the valve disc (4) are substantially pressure compensated in a closed position, and further wherein the armature (3) and the valve disc (4) have faces (12, 13) which lie opposite one another at the valve chamber (10) and are substantially equal in size in order to achieve a pressure balance in the closed position.

2. The solenoid valve according to claim 1, characterized in that a plurality of through-flow apertures (6) open into the recess (7).

3. The solenoid valve according to claim 1, characterized in that a plurality of recesses (7) are formed in the end face (8) of the valve plate (5), the sealing face (9) of the valve disc (4) lying opposite said recesses in order to seal the same off from the valve chamber (10).

4. The solenoid valve according to claim 1, characterized in that the valve disc (4) has a plurality of through-flow apertures (11) which lie opposite the end face (8) of the valve plate (5) in order to seal off the valve chamber (10) from the recess (7) or recesses (7) of the valve plate (5).

5. The solenoid valve according to claim 1, characterized in that the armature (3) delimits a pressure chamber (15) via an end face (14), which pressure chamber is sealed off from the valve chamber (10) by means of a sealing element (16) and can be fluidly connected via boreholes (17, 18) of the valve disc (4) and the valve plate (5) to the intake tract (1).

6. The solenoid valve according to claim 5, characterized in that the end face (14) of the armature (3) that delimits the pressure chamber (15) is substantially the same size as the sealing face (9) of the valve disc (4), which sealing face can be brought into register with the recess (7) or recesses (7) of the valve plate (5) so that the armature (3) and the valve disc (4) are substantially pressure compensated in a closed position.

7. The solenoid valve according to claim 1, characterized in that a plurality of recesses (7) are formed in the end face (8) of the valve plate (5), the sealing face (9) of the valve disc (4) lying opposite said recesses in order to seal the same off from the valve chamber (10), wherein each recess (7) in plan view has a circular arc-shaped course and the multiple recesses (7) running in a circular arc-shaped manner are disposed concentrically to one another.

* * * * *